United States Patent Office
3,749,750
Patented July 31, 1973

3,749,750
ALKYL ESTERS OF SUBSTITUTED PHENYL-
SULFONYL ALKANOIC ACIDS
Peter H. L. Wei, Springfield, Pa., assignor to American
Home Products Corporation, New York, N.Y.
No Drawing. Filed June 25, 1971, Ser. No. 156,942
Int. Cl. C07c 147/06, 147/12
U.S. Cl. 260—470  4 Claims

ABSTRACT OF THE DISCLOSURE

Novel 3-benzoyl-3-benzene sulfonyl alkanoic acids, alkyl esters are described which are useful as antitubercular agents.

---

The present invention is concerned with novel 3-benzoyl-3-benzene sulfonyl alkanoic acid, alkyl esters which have antitubercular activity against tubercle bacilli in vitro in standard biological tests.

The compounds of the present invention are represented by the formula:

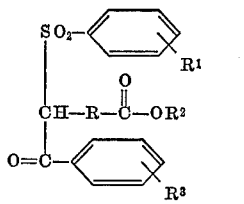

wherein R is (lower)alkylene; $R^1$ is selected from the group consisting of hydrogen, (lower)alkyl, halo, (lower)alkoxy, $NH_2$ and $NO_2$; $R^2$ is (lower)alkyl; $R^3$ is selected from the group consisting of hydrogen, (lower)alkyl, halo, (lower)alkoxy, $NH_2$, $NO_2$ and phenyl.

The preferred compounds have the formula:

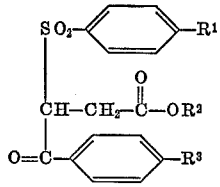

wherein $R^2$ has the same meaning as in Formula I, $R^1$ is selected from the class consisting of halo and (lower)alkyl and $R^3$ is selected from the class consisting of halo, (lower)alkyl and phenyl.

When used herein and in the appended claims the term "lower alkylene" means a divalent saturated straight or branch chain hydrocarbon radical having one to six carbon atoms, including, for example, methylene, propylene, isobutylene, hexylene. The term "lower alkyl" means a straight or branch chain hydrocarbon radical having one to six carbon atoms, e.g. methyl, ethyl, propyl, butyl, isobutyl, hexyl, sec-butyl, etc. The term "halo" means chlorine, bromine, fluorine and iodine atoms. The term "lower alkoxy" means a straight or branch chain alkoxy radical having one to six carbon atoms, e.g. methoxy, propoxy, butoxy, isobutoxy, ethoxy, etc.

The compounds of Formula I are prepared by reacting a compound of Formula III with a compound of Formula IV as follows:

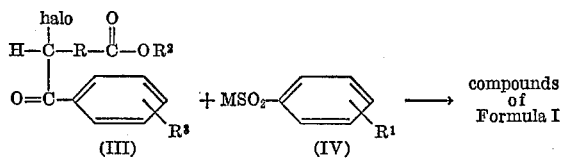

wherein M is an alkali metal (e.g. Na, K, etc.).

The foregoing process is carried out under conditions which are not particularly critical. The materials are reacted together at elevated temperatures, preferably about 80° to about 100° C. in the presence of a lower alkanol, the alkyl portion of which corresponds to $R^2$, until the reaction is complete after which the solvent is removed and the residue dissolved in an inert solvent (e.g. benzene). This dissolved residue solution is then washed with water and dried. After removal of the inert solvent, an oily residue is recovered and treated with petroleum ether and the solid collected. This crude material is then recrystallized in a suitable organic solvent.

The starting materials of Formula III (3-benzoyl-3-haloalkanoic acid, lower alkyl esters are known compounds or may be prepared in accordance with well recognized prior art procedures. For example, a 3-benzoyl-3-halopropionic acid, (lower)alkyl ester may be prepared by a three-step process which involves: (a) reacting succinic anhydride with an appropriate aryl compound under Friedel-Crafts conditions to afford a 3-benzoyl-propionic acid intermediate, (b) halogenating the intermediate to give a 3-halo-3-benzoylpropionic acid and (c) esterifying the haloacid so produced. Alternatively, 3-benzoylpropionic acids may be prepared by treating an appropriate phenyl Grignard reagent with succinic anhydride. The alternative method is preferred when it is desired to prepare a 3-benzoylpropionic acid in which the phenyl moiety of the benzoyl group contains a meta-directing substituent.

The starting substituted sulfinic acids of Formula IV are well known prior art materials.

The following examples show the preparation of a number of compounds within the scope of this invention. They are merely illustrative and are not to be construed to limit the scope of the claims.

EXAMPLE 1

3-(p-chlorobenzoyl)-3-(p-tolylsulfonyl)propionic acid, ethyl ester

An ethanol solution of 3-bromo-3-(p-chlorobenzoyl)propionic acid, ethyl ester (6.4 g., .02 m.) and p-toluenesulfinic acid, sodium salt (4.2 g., .02 m.) is heated on a steam bath for 3 hours. The solvent is removed and the residue dissolved in benzene. The benzene solution is washed with water and then dried over anhydrous $MgSO_4$. After removal of benzene the oily residue is treated with petroleum ether, and the solid is collected (7.2 g.). Recrystallization from a mixture of benzene and cyclohexane gives 3-(p-chlorobenzoyl) - 3 - (p-tolylsulfonyl)propionic acid, ethyl ester, M.P. 118–119° C.

Analysis.—Calcd. for $C_{19}H_{19}ClO_5S$ (percent): C, 57.79; H, 4.85; Cl, 8.98; S, 8.12. Found (percent): C, 57.91; H, 4.90; Cl, 8.88; S, 7.79.

I.R. analysis: Spectrum (KBr) showed ester, 5.75µ; ketone, 5.9µ; sulfone, 7.75 and 8.7µ.

NMR analysis: Spectrum (CDCl₃) showed four aromatic, multiplet 7.5δ; one methine, overlapping doublet 5.4δ; two methylene, multiplet 3.2δ; toluene methyl, singlet 2.35δ; ethoxy, quarter 3.95 and triplet, 1.05δ.

EXAMPLE 2

3-(4-biphenylylcarbonyl)-3-(p-tolylsulfonyl)propionic acid, ethyl ester

By following the procedure of Example 1 substituting 3 - (4-biphenylylcarbonyl)-3-bromopropionic acid, ethyl ester for 3-bromo-3-(p-chlorobenzoyl)propionic acid, ethyl ester, 7.8 g. of the title compound is obtained. Recrystallized (benzene-cyclohexane) compound melted at 119–121° C.

Analysis.—Calcd. for $C_{25}H_{24}O_5S$ (percent): C, 68.79; H, 5.54; S, 7.35. Found (percent): C, 68.87; H, 5.59; S, 7.20.

I.R. analysis: Spectrum (KBr) ester 5.75μ, keto 5.9μ, sulfone 7.5μ and 8.6μ.

NMR (CDCl₃): Nine aromatic, multiplet 7.5δ; one methine overlapping doublet; two methylene multiplet, 3.3δ; toluene methyl, singlet 2.3δ; ethoxy, quartet, 4.0δ and triplet, 1.1δ.

EXAMPLE 3

Following the procedure of Example 1, but substituting equivalent amounts of the appropriate substituted 3-halo-3-benzoylalkanoic acid, lower alkyl ester for 3-bromo-3-(p-chlorobenzoyl)propionic acid, lower alkyl ester, there is obtained:

| Substituted 3-halo-3-benzoyl-propionic acid, lower alkyl ester | Product |
|---|---|
| 3-bromo-3-(p-chlorbenzoyl) butyric acid, ethyl ester. | 3-(p-chlorobenzoyl)-3-(p-toylsulfonyl)butyric acid, ethyl ester. |
| 3-bromo-3-(p-methylbenzoyl) propionic acid, methyl ester. | 3-(p-methylbenzoyl)-3-(p-tolylsulfonyl) propionic acid, methyl ester. |
| 3-bromo-3-(m-methoxybenzoyl) propionic acid, ethyl ester. | 3-m-methoxybenzoyl)-3-(p-tolylsulfonyl) propionic acid, ethyl ester. |
| 3-bromo-3-(p-nitrobenzoyl) propionic acid, ethyl ester. | 3-(p-nitrobenzoyl)-3-(p-tolylsulfonyl) propionic acid, ethyl ester. |

Following the procedure of Example 1, but substituting equivalent amounts of the appropriate substituted sulfinic acid for p-toluene sulfinic acid and reacting it with the benzoyl propionic acid identified in that example, there is obtained:

| Substituted phenyl sulfinic acid | Product |
|---|---|
| p-Chlorobenzene sulfinic acid | 3-(p-chlorobenzoyl)-3-(p-chlorobenzene sulfonyl) propionic acid, ethyl ester. |
| p-Aminobenzene sulfinic acid | 3-(p-chlorobenzoyl)-3-(p-aminobenzene sulfonyl) propionic acid, ethyl ester. |
| m-Toluene sulfinic acid | 3-(p-chlorobenzoyl)-3-(m-tolyl sulfonyl) propionic acid, ethyl ester. |
| p-Nitrobenzenesulfinic acid | 3-(p-chlorobenzoyl)-3-(p-nitrobenzene sulfonyl) propionic acid, ethyl ester. |
| Benzene sulfinic acid | 3-(p-chlorbenzoyl)-3-(benzene sulfonyl) propionic acid, ethyl ester. |

The compounds of Formula I of this invention have been found to possess antitubercular activity against tubercule bacilli in vitro. In standard tube dilution tests the growth of M. tuberculosis (human type-strain H 37 RV) and M. tuberculosis (bovine type, strain Ravenel) were completely inhibited at about 0.5μ/ml. In the test employed the growth media is a Dubos oleic acid liquid medium or Kirchner's medium plus "Triton A–20." Stock cultures are maintained on Dorset Egg agar. The standard used is isonicotinic acid hydrazide. The stock solution is prepared at 1,000 μg./ml. of substance in a vehicle such as distilled water. Two-fold dilutions are made in sterile water. One ml. quantities of each dilution are incorporated into nine ml. of Dubos oleic acid liquid medium to give final concentrations of 0.01–100 μmg./ml. Tubes are seeded with 0.1 ml. of test organism and incubated two weeks at 37° C. The end point is reported as a minimal inhibitory concentration (MIC) expressed in μg./ml.—the least amount of test substance that will completely inhibit the test organism.

Thus the compounds of the present invention may be incorporated in bactericidally active industrial cleaning compositions and in soaps and detergents intended for veterinary use and in biocidally active wash solutions to decontaminate premises. They may be applied according to the end use as powders, solutions, suspensions and the like. In working solutions for pastures and barns, the active compounds of this invention will be used generally in the range of from about 0.1 to about 0.5% μg./ml.

The compounds of the present invention may also be administered orally or intraperitoneally to warm-blooded mammals. In rats no toxicity was shown at a dose of about 400 mg. per kg.

What is claimed is:

1. A compound of the formula

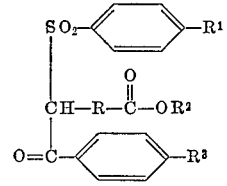

wherein R is $C_1$ through $C_6$ alkylene; $R^1$ is selected from the group consisting of hydrogen, (lower)alkyl, halo, (lower)alkoxy and $NO_2$; $R^2$ is (lower) alkyl; $R^3$ is selected from the group consisting of hydrogen, (lower)alkyl, halo, (lower)alkoxy, $NO_2$ and phenyl.

2. A compound of the formula

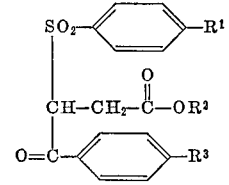

wherein:
$R^1$ is selected from the class consisting of halo and (lower)alkyl; $R^2$ is (lower)alkyl; and $R^3$ is selected from the class consisting of halo, (lower)alkyl and phenyl.

3. A compound as set forth in claim 2 which is: 3-(p-chlorobenzoyl) - 3 - (p-tolylsulfonyl)propionic acid, ethyl ester.

4. A compound as set forth in claim 2 which is: 3-(4-biphenylcarbonyl)-3-(p-tolylsulfonyl)propionic acid, ethyl ester.

References Cited
FOREIGN PATENTS
593,024   5/1945   England.

OTHER REFERENCES
Kotake, C.A. 41, 3072.
Lindberg, Acta Chemica Scandinavica 17 B93 (1963).
Gibson et al., J. Chem. Soc. 487 (1937).
Urake et al., J. Electrochem. Soc. Japan. 27 E201 (1959).
Pappalardo, Am. Chim. 53(5), 630 (1963).
Lindberg, Acta. Chim. Acta. 20, 1843 (1966).
Lindberg, Acta. Chim. Acta. 17, 377 (1963).
Brewster et al., "Organic Chemisrty" Prentice-Hall (1961), 558, 564.

LORRAINE A. WEINBERGER, Primary Examiner

J. F. TERAPANE, Assistant Examiner

U.S. Cl. X.R.
260—400, 405, 469, 471 R, 473 R, 476 R; 426—308, 309